United States Patent
Shimada

(10) Patent No.: US 7,872,671 B2
(45) Date of Patent: Jan. 18, 2011

(54) IMAGE PICKUP APPARATUS AND IMAGE PICKUP METHOD

(75) Inventor: Junji Shimada, Kanagawa (JP)

(73) Assignee: Sony Corporation (JP)

( * ) Notice: Subject to any disclaimer, the term of this patent is extended or adjusted under 35 U.S.C. 154(b) by 420 days.

(21) Appl. No.: 11/508,468

(22) Filed: Aug. 23, 2006

(65) Prior Publication Data

US 2007/0046783 A1 Mar. 1, 2007

(30) Foreign Application Priority Data

Aug. 26, 2005 (JP) .............. P2005-246578

(51) Int. Cl.
*H04N 5/228* (2006.01)
*G03B 17/00* (2006.01)

(52) U.S. Cl. .................... 348/208.6; 396/55

(58) Field of Classification Search ........... 348/208.99, 348/208.6, 239, 208.1, 238, 208.13, 208.2, 348/208.4; 396/52, 55
See application file for complete search history.

(56) References Cited

U.S. PATENT DOCUMENTS

| | | | | |
|---|---|---|---|---|
| 5,436,658 A | * | 7/1995 | Onga et al. | 348/239 |
| 5,894,325 A | * | 4/1999 | Yonemoto | 348/302 |
| 6,122,004 A | * | 9/2000 | Hwang | 348/208.13 |
| 6,778,768 B2 | * | 8/2004 | Ohkawara et al. | 396/55 |

FOREIGN PATENT DOCUMENTS

| | | |
|---|---|---|
| JP | 4-157987 A | 5/1992 |
| JP | 8-098094 A | 4/1996 |
| JP | 2002-016832 A | 1/2002 |
| JP | 2005-181456 A | 7/2005 |

* cited by examiner

*Primary Examiner*—David L Ometz
*Assistant Examiner*—Ahmed A Berhan
(74) *Attorney, Agent, or Firm*—Lerner, David, Littenberg, Krumholz & Mentlik, LLP

(57) ABSTRACT

An image pickup apparatus to pick up images by using a solid-state image pickup device includes an image signal reading unit configured to read image signals of a rectangular effective area in an image picked up by the solid-state image pickup device; an effective area setting unit configured to set the effective area to the image signal reading unit so that pixel signals of all pixels of the solid-state image pickup device in one of vertical and horizontal directions of the effective area are read and that a redundant pixel area is provided in the other direction; a camera shake detecting unit configured to detect camera shake in the image pickup apparatus; and a camera shake correction control unit configured to shift the effective area to the other direction so as to correct the camera shake in the other direction detected by the camera shake detecting unit.

6 Claims, 8 Drawing Sheets

IMAGE PICKUP APPARATUS AND IMAGE PICKUP METHOD

CROSS REFERENCES TO RELATED APPLICATIONS

The present invention contains subject matter related to Japanese Patent Application JP 2005-246578 filed in the Japanese Patent Office on Aug. 26, 2005, the entire contents of which are incorporated herein by reference.

BACKGROUND OF THE INVENTION

1. Field of the Invention

The present invention relates to an image pickup apparatus and an image pickup method, and particularly to an image pickup apparatus and an image pickup method for picking up images by using a solid-state image pickup device.

2. Description of the Related Art

In recent years, image pickup apparatuses such as digital cameras and video cameras have been requested to pick up images of higher quality. Accordingly, image pickup devices of more pixels have been used in the image pickup apparatuses. In the image pickup apparatus using an image pickup device of more pixels, images of high resolution can be picked up, but camera shake is more visible. Furthermore, the image pickup apparatus is requested to have a higher-power lens. Thus, situations where camera shake is visible increase.

Under these circumstances, a camera shake correcting function is provided in image pickup apparatuses in many cases. By using the camera shake correcting function, camera shake can be corrected through a process performed in the image pickup apparatus and a sharp image free from camera shake can be picked up.

Among image pickup apparatuses having a camera shake correcting function, the following image pickup apparatus has been proposed in Patent Document 1: Japanese Unexamined Patent Application Publication No. 2005-181456 (paragraphs [0017] to [0040] and FIG. 1. In this image pickup apparatus, ghost or flare caused by reflection of an unnecessary luminous flux in a lens barrel can be prevented by driving a shield to prevent the unnecessary luminous flux from entering the lens barrel in accordance with a camera shake correcting operation to correct camera shake caused by an operator.

SUMMARY OF THE INVENTION

In order to use an electronic camera shake correcting function, a solid-state image pickup device includes an effective area and a redundant pixel area. The effective area consists of pixels contributing to image pickup, whereas the redundant pixel area is outside the effective area and does not contribute to generating images. With this configuration, the amount of pixel information is smaller than that of an image generated by making the most of the pixels of the solid-state image pickup device, and thus the resolution and quality of the image are low.

The present invention has been made in view of these circumstances and is directed to providing an image pickup apparatus capable of realizing high resolution by making the most of the pixels of a solid-state image pickup device and also capable of correcting camera shake.

According to an embodiment of the present invention, there is provided an image pickup apparatus to pick up images by using a solid-state image pickup device. The image pickup apparatus includes an image signal reading unit configured to read image signals of a rectangular effective area in an image picked up by the solid-state image pickup device; an effective area setting unit configured to set the effective area to the image signal reading unit so that pixel signals of all pixels of the solid-state image pickup device in one of vertical and horizontal directions of the effective area are read and that a redundant pixel area is provided in the other direction; a camera shake detecting unit configured to detect camera shake in the image pickup apparatus; and a camera shake correction control unit configured to shift the effective area set to the image signal reading unit to the other direction so as to correct the camera shake in the other direction detected by the camera shake detecting unit.

According to the image pickup apparatus, the image signal reading unit reads image signals of a rectangular effective area in an image picked up by the solid-state image pickup device. The effective area setting unit sets the effective area to the image signal reading unit so that pixel signals of all pixels of the solid-state image pickup device in one of vertical and horizontal directions of the effective area are read and that a redundant pixel area is provided in the other direction. The camera shake detecting unit detects camera shake in the image pickup apparatus. The camera shake correction control unit shifts the effective area set to the image signal reading unit to the other direction so as to correct the camera shake in the other direction detected by the camera shake detecting unit.

In the image pickup apparatus according to the embodiment of the present invention, an effective area is set so that pixel signals of all pixels of the solid-state image pickup device in one of vertical and horizontal directions of the effective area are read and that a redundant pixel area is provided in the other direction. Therefore, pixels of a picked up image can be used to a maximum extent with respect to the aspect of the effective area. Accordingly, an image of high resolution and high quality can be picked up. Furthermore, by setting the effective area so that a redundant pixel area is provided in the direction orthogonal to the direction of reading all pixels and by shifting the effective area in accordance with camera shake in that direction, the camera shake in the orthogonal direction can be corrected.

DESCRIPTION OF THE PREFERRED EMBODIMENT

Hereinafter, an embodiment of the present invention is described in detail with reference to the drawings.

Figure 1:
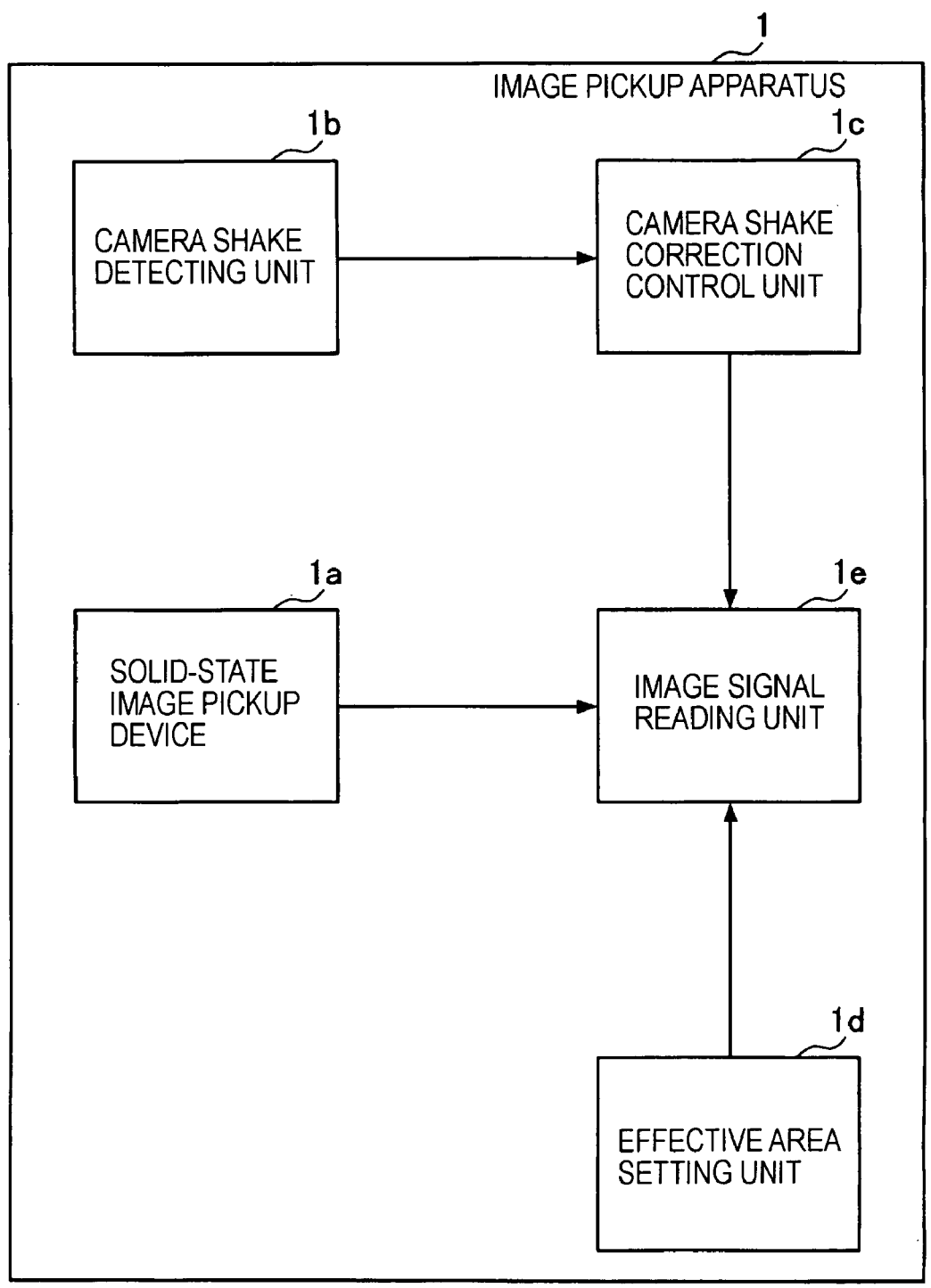
FIG. 1 shows a concept of an embodiment of the present invention.

FIG. 1 illustrates a concept of the embodiment of the present invention. As shown in FIG. 1, an image pickup apparatus 1 includes a solid-state image pickup device 1a, a camera shake detecting unit 1b, a camera shake correction control unit 1c, an effective area setting unit 1d, and an image signal reading unit 1e.

The solid-state image pickup device 1a is a device to convert applied light to an electrical signal and output the signal, such as a CCD (charge coupled device) or a CMOS (complementary metal oxide semiconductor) sensor. The camera shake detecting unit 1b detects camera shake occurred in the image pickup apparatus 1. More specifically, the camera shake detecting unit 1b constantly detects output from a gyro sensor or the like, records a previous output and a present output, and checks the sign of a difference between the present output and the previous output. If the sign remains the same for a predetermined period or more and if the output value is equal to or larger than a threshold for a predetermined period or more, the camera shake detecting unit 1b determines that the state is a pan or tilt state.

The camera shake correction control unit 1c receives a camera shake detection signal, which indicates camera shake detected by the camera shake detecting unit 1b, and outputs a shift instruction signal so that an effective area shifts to a direction opposite to the camera shake direction. The effective area setting unit 1d sets an aspect ratio of a rectangular effective area in a picked up image output from the solid-state image pickup device 1a irradiated with light. Also, the effective area setting unit 1d sets an effective area so that pixel signals of all pixels in at least one of horizontal and vertical directions are read by considering the aspect ratio of the solid-state image pickup device 1a and the aspect ratio of the set effective area. The image signal reading unit 1e determines the position of the effective area in a picked up image on the basis of information, such as the aspect ratio of the effective area set by the effective area setting unit 1d. Also, the image signal reading unit 1e receives a camera shake correction control signal output from the camera shake correction control unit 1c and shifts the position of the effective area in the picked up image in accordance with the camera shake.

According to the above-described image pickup apparatus 1, more pixel signals generated through conversion of light received by the solid-state image pickup device 1a can be used, and at the same time, redundant pixels provided at both ends of the effective area set on a picked up image can be used to correct camera shake. By using the more pixel signals, images of high resolution and high quality can be picked up. Furthermore, images free from camera shake can be picked up by correcting camera shake.

Figure 2:
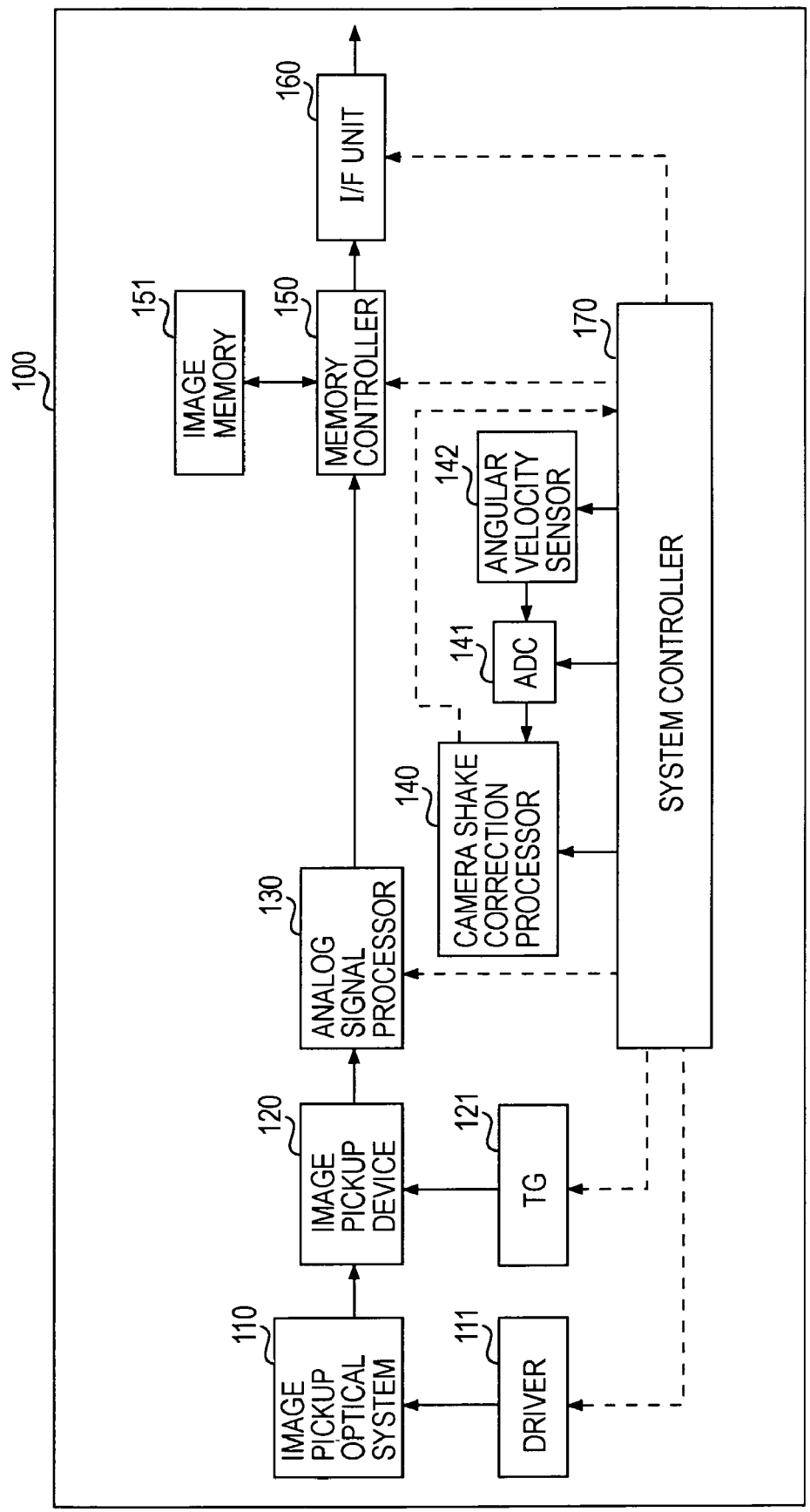
FIG. 2 shows an example of a system configuration of an image pickup apparatus according to the embodiment of the present invention.

FIG. 2 shows an example of a system configuration of the image pickup apparatus according to the embodiment of the present invention. As shown in FIG. 2, the image pickup apparatus 100 includes an image pickup optical system 110, a driver 111, an image pickup device 120, a TG (timing generator) 121, an analog signal processor 130, a camera shake correction processor 140, an ADC (analog to digital converter) 141, an angular velocity sensor 142, a memory controller 150, an image memory 151, an I/F (interface) unit 160, and a system controller 170.

The image pickup optical system 110 includes a zoom lens to zoom an object, a focus lens to adjust a focal length, an iris to adjust the amount of light, an ND (neutral density) filter, and a driving device for those components. The driver 111 drives the zoom lens, the focus lens, the iris, and the ND filter.

The image pickup device 120 outputs primary-color signals of RGB (red, green, and blue) or complementary-color analog signals, the signals being generated through photoelectric conversion of light from an object entered via the image pickup optical system 110. Hereinafter, an image constituted by pixel signals of all pixels in the image pickup device 120 is called an entire image. The TG 121 generates various timing signals to drive the image pickup device 120. For example, the various timing signals include horizontal synchronizing signals and vertical synchronizing signals. The analog signal processor 130 is configured as an IC (integrated circuit), receives analog pixel signals from the image pickup device 120, performs sample holding in each color, controls the gain, and converts the analog signals to digital signals.

The camera shake correction processor 140, the angular velocity sensor 142, and the ADC 141 to convert analog output from the angular velocity sensor 142 to digital data are function blocks to correct camera shake. The angular velocity sensor 142 is a sensor from which output according to the amount of camera shake in a V direction (corresponding to the vertical direction with respect to a light receiving surface of the image pickup device 120) or an H direction (corresponding to the horizontal direction with respect to the light receiving surface of the image pickup device 120) can be obtained. A digital output obtained from the angular velocity sensor 142 is processed by the camera shake correction processor 140, and the processing result is output to the system controller 170, so that camera shake is corrected.

The memory controller 150 receives instructions from the system controller 170, sets an aspect ratio of an effective area, which is a range of pixels used for an output image, and a position of the effective area on the entire image, and reads the image from the image memory 150. Before outputting the image, the memory controller 150 shifts the effective area in accordance with the amount of camera shake transmitted from the system controller 170 so as to correct camera shake. The image memory 151 is a memory to adjust a temporal phase of detection and correction of camera shake. The entire image output from the analog signal processor 130 is stored in the image memory 151 through the memory controller 150, is delayed by the time required to detect a motion vector of camera shake, and is read from the image memory 151 while the camera shake being corrected in the memory controller 150.

The I/F unit 160 includes a digital circuit and outputs images in units of fields or frames. The system controller 170 controls the I/F unit 160 on the basis of the control of the driver 111, the TG 121, and the analog signal processor 130, and the camera shake detection/correction control by the camera shake correction processor 140, the ADC 141, the angular velocity sensor 142, and the memory controller 150. Also, upon receiving a switch signal to an all-pixels reading mode, the system controller 170 transmits an instruction signal to change the size of an effective area in the entire image stored in the image memory 151 to the memory controller 150.

When the all-pixels reading mode is ON, an effective areas can be variously set in accordance with the aspect ratios of the entire image and an image output from the image pickup apparatus 100. In the all-pixels reading mode, pixel signals of all pixels in at least one of the V direction and H direction among pixel signals that can be output from the image pickup device 120 are read. Hereinafter, how the effective area is set when the all-pixels reading mode is selected is described by using examples where the aspect ratio of the entire image is 16:9 or 4:3 and the aspect ratio of the output image is 16:9 or 4:3.

Figure 3A:
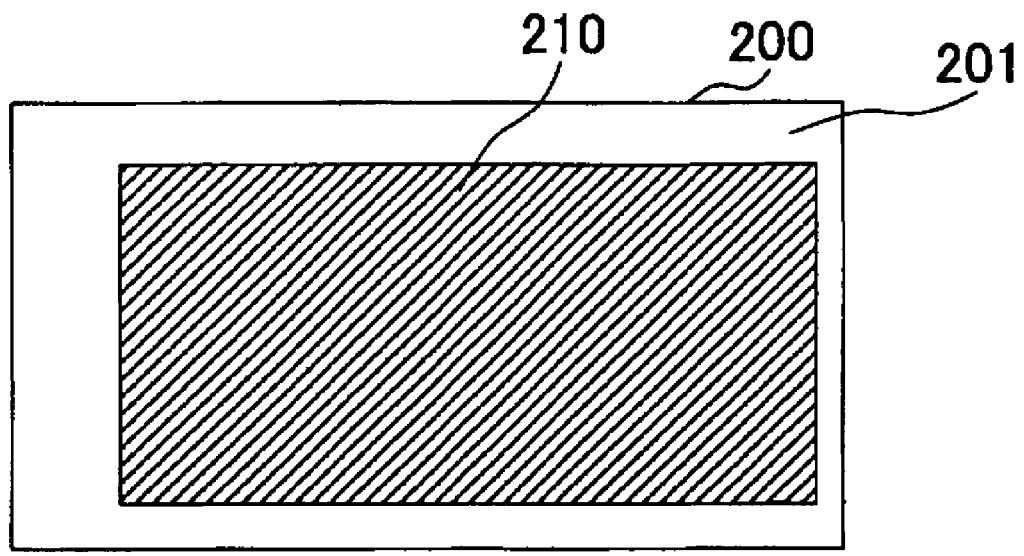
FIGS. 3A and 3B show examples of an effective area when the aspect ratio of an entire image is 16:9 and when the aspect ratio of an output image is 16:9.
Figure 3B:
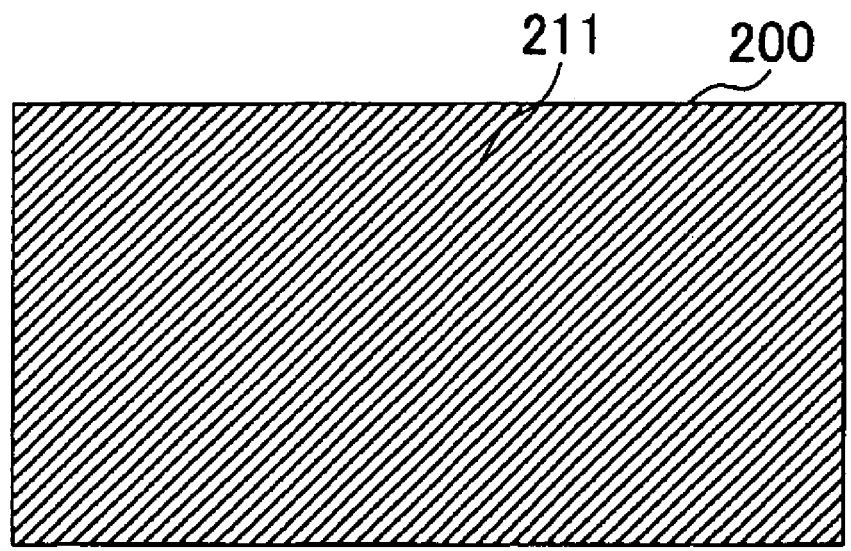

FIGS. 3A and 3B show examples of an effective area when the aspect ratio of the entire image is 16:9 and when the aspect ratio of the output image is 16:9. FIG. 3A shows a state where the all-pixels reading mode is OFF, whereas FIG. 3B shows a state where the all-pixels reading mode is ON. As shown in FIG. 3A, an effective area 210 having an aspect ratio of 16:9 is set in an entire image 200 having an aspect ratio of 16:9. The entire image 200 is constituted by pixel signals output from all pixels in the image pickup device 120. The effective area 210 is set with respect to a partial or entire range of the entire image 200, and pixel signals in the set range are output from the memory controller 150. A redundant pixel area 201 is an area where the effective area 210 is not set in the entire image 200. Camera shake is corrected by using the redundant pixel area 201.

If the all-pixels reading mode is selected under the condition where the aspect ratio of the entire image 200 is 16:9 and the aspect ratio of the effective area 210 is 16:9, the entire image 200 matches an effective area 211, as shown in FIG. 3B. Accordingly, all of the pixel signals that can be output from the image pickup device 120 can be used for the output image.

Figure 4A:
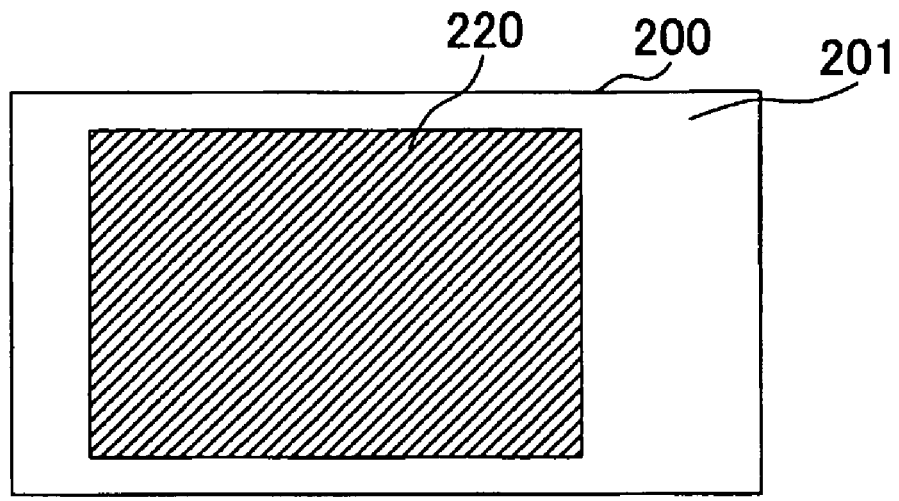
FIGS. 4A and 4B show examples of an effective area when the aspect ratio of the entire image is 16:9 and when the aspect ratio of the output image is 4:3.
Figure 4B:
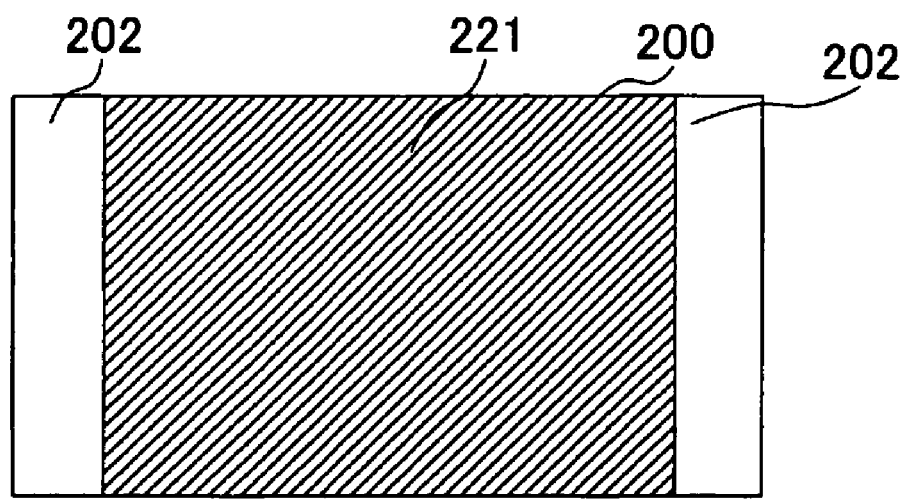

FIGS. 4A and 4B show examples of an effective area when the aspect ratio of the entire image is 16:9 and when the aspect ratio of the output image is 4:3. FIG. 4A shows a state where the all-pixels reading mode is OFF and FIG. 4B shows a state where the all-pixels reading mode is ON. As shown in FIG. 4A, an effective area 220 having an aspect ratio of 4:3 is set in the entire image 200 having an aspect ratio of 16:9. The entire image 200 is constituted by pixel signals output from all pixels in the image pickup device 120. The effective area 220 is set with respect to a partial or entire range of the entire image 200, and pixel signals in the set range are output from the memory controller 150. The redundant pixel area 201 is an area where the effective area 220 is not set in the entire image 200. Camera shake is corrected by using the redundant pixel area 201.

If the all-pixels reading mode is selected under the condition where the aspect ratio of the entire image 200 is 16:9 and the aspect ratio of the effective area 220 is 4:3, an effective area 221 is set in the manner shown in FIG. 4B, that is, all pixels in the V direction of the entire image 200 are used and redundant pixel areas 202 are provided in the H direction. The number of input pixels in the H direction is $3/4$ times that of the entire size. Camera shake is corrected in the H direction by using the redundant pixel areas 202.

Figure 5A:
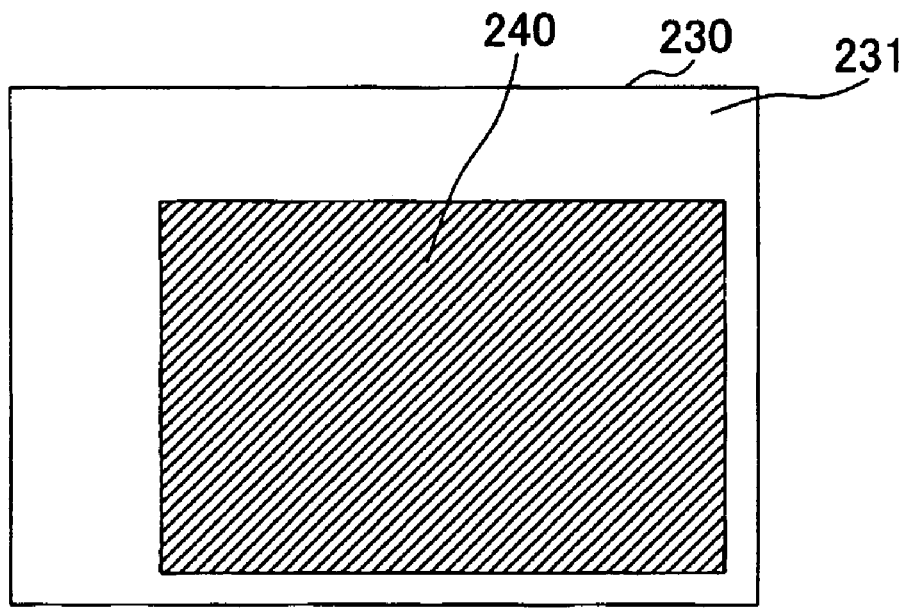
FIGS. 5A and 5B show examples of an effective area when the aspect ratio of the entire image is 4:3 and when the aspect ratio of the output image is 4:3.
Figure 5B:
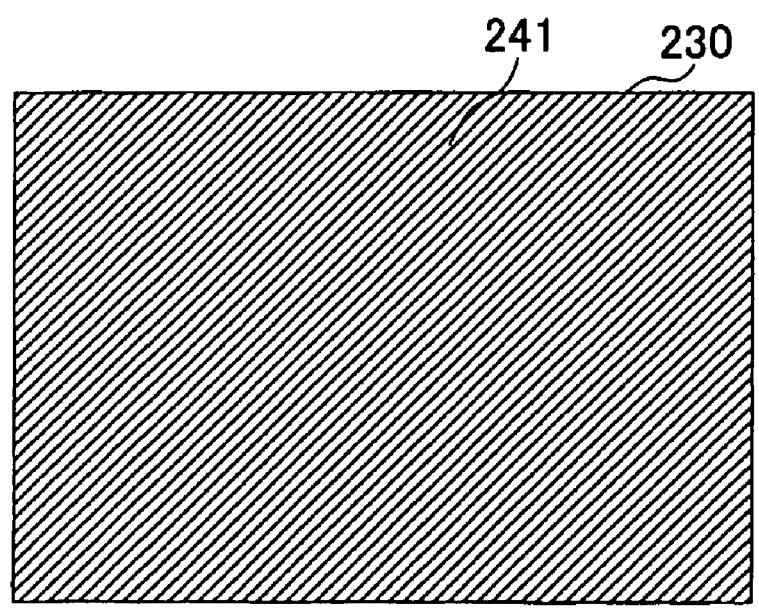

FIGS. 5A and 5B show examples of an effective area when the aspect ratio of the entire image is 4:3 and when the aspect ratio of the output image is 4:3. FIG. 5A shows a state where the all-pixels reading mode is OFF and FIG. 5B shows a state where the all-pixels reading mode is ON. As shown in FIG. 5A, an effective area 240 having an aspect ratio of 4:3 is set in an entire image 230 having an aspect ratio of 4:3. The entire image 230 is constituted by pixel signals output from all pixels in the image pickup device 120. The effective area 240 is set with respect to a partial or entire range of the entire image 230, and pixel signals in the set range are output from the memory controller 150. A redundant pixel area 231 is an area where the effective area 240 is not set in the entire image 230. Camera shake is corrected by using the redundant pixel area 231.

If the all-pixels reading mode is selected under the condition where the aspect ratio of the entire image 230 is 4:3 and the aspect ratio of the effective area 240 is 4:3, the entire image 230 matches an effective area 241, as shown in FIG. 5B. Accordingly, all of the pixel signals that can be output from the image pickup device 120 can be used for the output image.

Figure 6A:
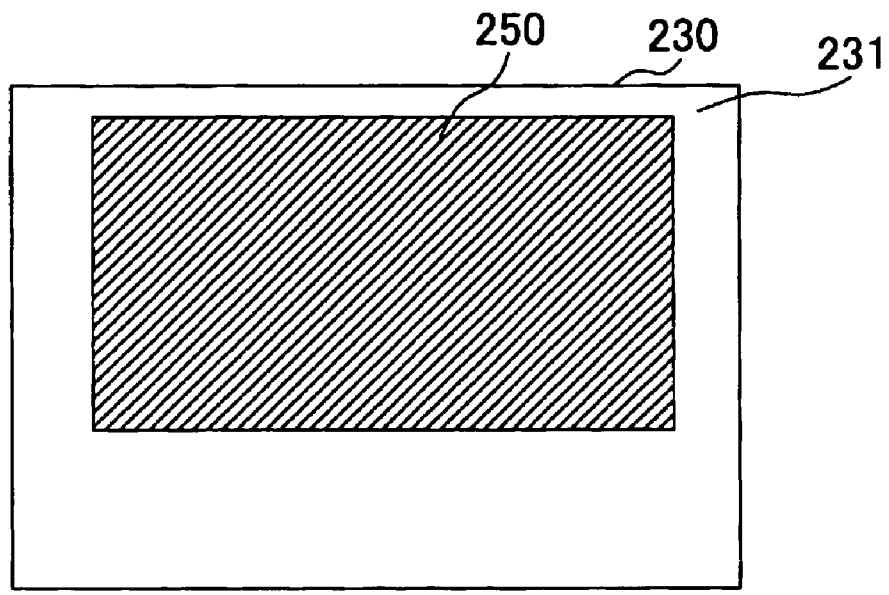
FIGS. 6A and 6B show examples of an effective area when the aspect ratio of the entire image is 4:3 and when the aspect ratio of the output image is 16:9.
Figure 6B:
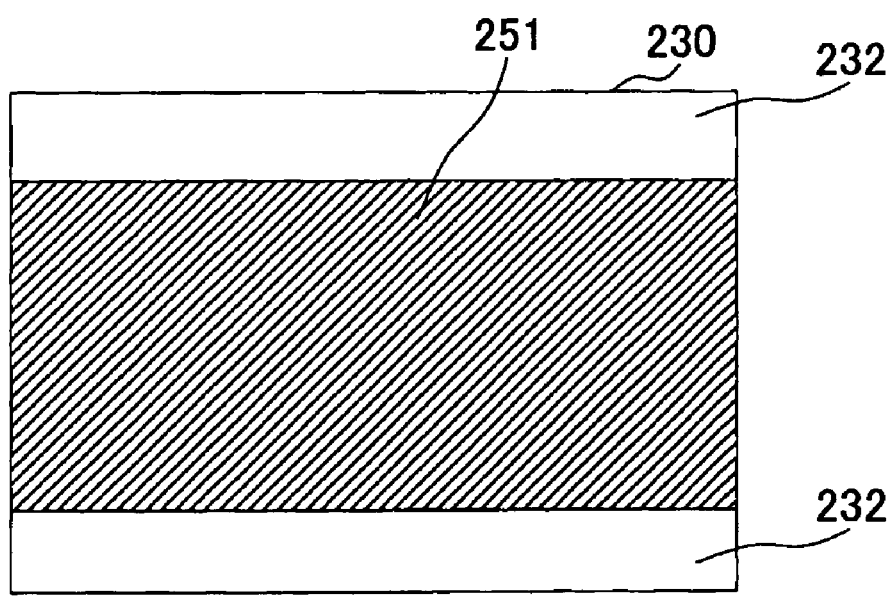

FIGS. 6A and 6B show examples of an effective area when the aspect ratio of the entire image is 4:3 and when the aspect ratio of the output image is 16:9. FIG. 6A shows a state where the all-pixels reading mode is OFF and FIG. 6B shows a state where the all-pixels reading mode is ON. As shown in FIG. 6A, an effective area 250 having an aspect ratio of 16:9 is set in the entire image 230 having an aspect ratio of 4:3. The entire image 230 is constituted by pixel signals output from all pixels in the image pickup device 120. The effective area 250 is set with respect to a partial or entire range of the entire image 230, and pixel signals in the set range are output from the memory controller 150. The redundant pixel area 231 is an area where the effective area 250 is not set in the entire image 230. Camera shake is corrected by using the redundant pixel area 231.

If the all-pixels reading mode is selected under the condition where the aspect ratio of the entire image 230 is 4:3 and the aspect ratio of the effective area 250 is 16:9, an effective area 251 is set in the manner shown in FIG. 6B, that is, all pixels in the H direction of the entire image 230 are used and redundant pixel areas 232 are provided in the V direction. The number of input pixels in the V direction is $3/4$ times that of the entire size. Camera shake is corrected in the V direction by using the redundant pixel areas 232.

When the all-pixels reading mode is ON, if a redundant pixel area exists even though the effective area is used to a maximum extent, camera shake is corrected by using the redundant pixel area. Hereinafter, such control is described.

Figure 7:
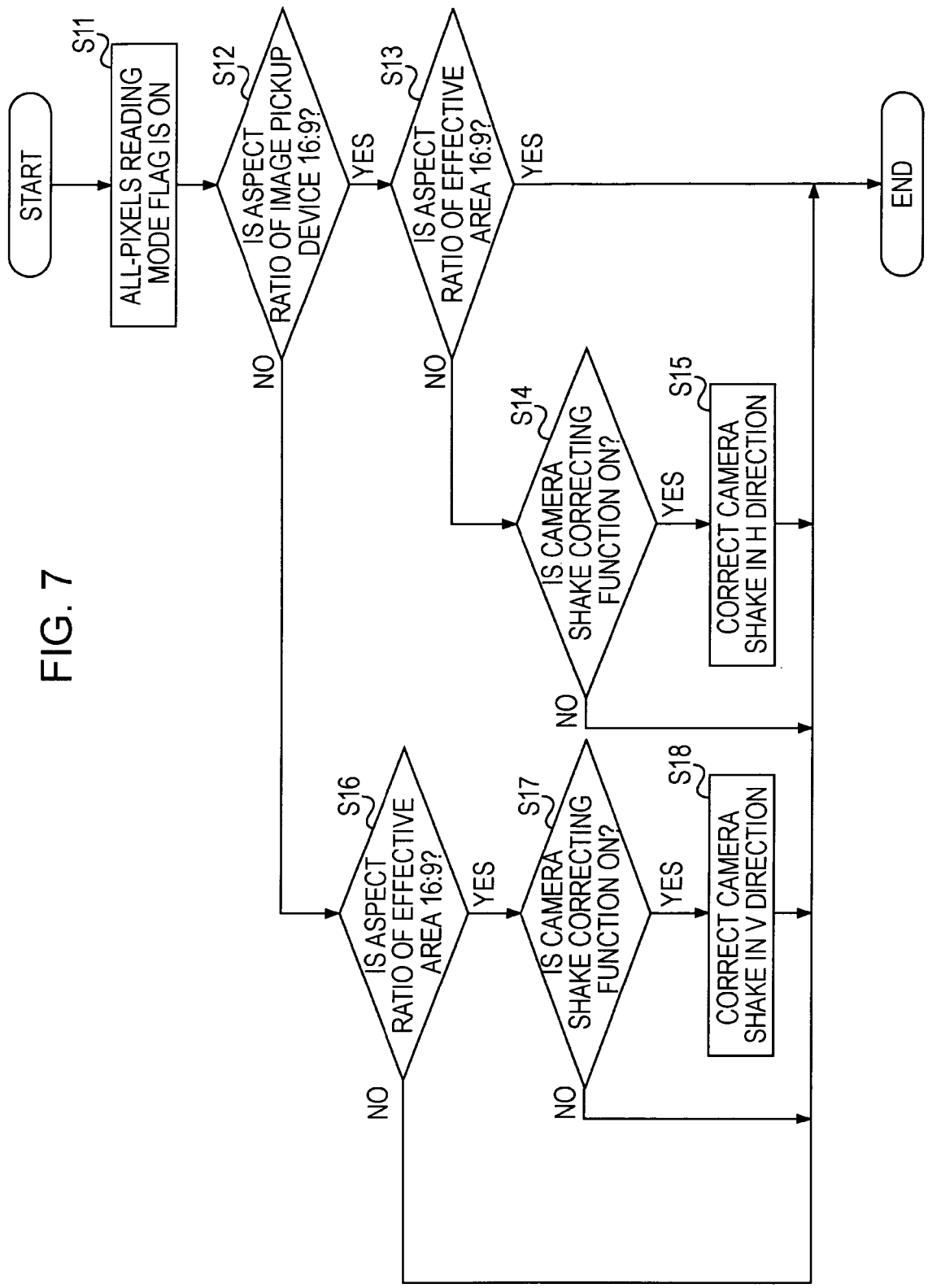
FIG. 7 is a flowchart of a camera shake correcting process performed by the image pickup apparatus.

FIG. 7 is a flowchart showing a camera shake correcting process performed by the image pickup apparatus. Hereinafter, the process shown in FIG. 7 is described with reference to the respective steps.

<Step S11>

The system controller 170 checks that the flag of the all-pixels reading mode is ON.

<Step S12>

The system controller 170 determines whether the aspect ratio of the image pickup device 120 is 16:9. If the system controller 170 determines that the aspect ratio is 16:9, the process proceeds to step S13. If not, the process proceeds to step S16. Hereinafter, the description is made on the assumption that the aspect ratio of the image pickup device 120 and the effective area is 16:9 or 4:3.

<Step S13>

The system controller 170 determines whether the aspect ratio of the effective area is 16:9. If the system controller 170 determines that the aspect ratio is 16:9, the process ends. That is, when the aspect ratio of both the image pickup device 120 and the effective area is 16:9, the entire image 200 matches the effective area 211 as shown in FIG. 3B. In this case, all of the pixel signals that can be output from the image pickup device 120 can be used to generate an image. However, it may be impossible to perform electronic camera shake correction because there is no redundant pixel area. On the other hand, if the system controller 170 determines that the aspect ratio of the effective area is 4:3, the process proceeds to step S14.

<Step S14>

The system controller 170 determines whether a camera shake correcting function is ON. If the system controller 170 determines that the camera shake correcting function is ON, the process proceeds to step S15. If not, the process ends.

<Step S15>
The system controller 170 outputs a control signal to perform camera shake correction in the H direction to the memory controller 150. The aspect ratio of the image pickup device 120 is 16:9 and the aspect ratio of the effective area is 4:3, and thus the effective area 221 and the redundant pixel areas 202 are set on the entire image 200, as shown in FIG. 4B. If camera shake in the H direction occurs and if the redundant pixel areas 202 exist, the camera shake can be corrected by shifting the effective area 221 in the H direction by using the redundant pixel areas 202 in accordance with the camera shake. Therefore, when the aspect ratio of the image pickup device 120 is 16:9 and when the aspect ratio of the effective area is 4:3, the number of pixel signals can be increased by turning ON the all-pixels reading mode. Accordingly, resolution can be increased and camera shake in the H direction can be corrected.

<Step S16>
The system controller 170 determines whether the aspect ratio of the effective area is 16:9. If the system controller 170 determines that the aspect ratio is 16:9, the process proceeds to step S17. If the system controller 170 determines that the aspect ratio is 4:3, the process ends. That is, when the aspect ratio of both the image pickup device 120 and the effective area is 4:3, the entire image 230 matches the effective area 241 as shown in FIG. 5B. In this case, all of the pixel signals that can be output from the image pickup device 120 can be used to generate an image. However, it may be impossible to perform electronic camera shake correction because there is no redundant pixel area.

<Step S17>
The system controller 170 determines whether the camera shake correcting function is ON. If the system controller 170 determines that the camera shake correcting function is ON, the process proceeds to step S18. If not, the process ends.

<Step S18>
The system controller 170 outputs a control signal to perform camera shake correction in the V direction to the memory controller 150. The aspect ratio of the image pickup device 120 is 4:3 and the aspect ratio of the effective area is 16:9, and thus the effective area 251 and the redundant pixel areas 232 are set on the entire image 230, as shown in FIG. 6B. If camera shake in the V direction occurs and if the redundant pixel areas 232 exist, the camera shake can be corrected by shifting the effective area 251 in the V direction by using the redundant pixel areas 232 in accordance with the camera shake. Therefore, when the aspect ratio of the image pickup device 120 is 4:3 and when the aspect ratio of the effective area is 16:9, the number of pixel signals can be increased by turning ON the all-pixels reading mode. Accordingly, resolution can be increased and camera shake in the V direction can be corrected.

When the all-pixels reading mode is ON under the condition where the camera shake correcting function is ON, if a redundant pixel area exists even though the effective area is used to a maximum extent, camera shake is corrected by using the redundant pixel area. Hereinafter, such control is described.

Figure 8:
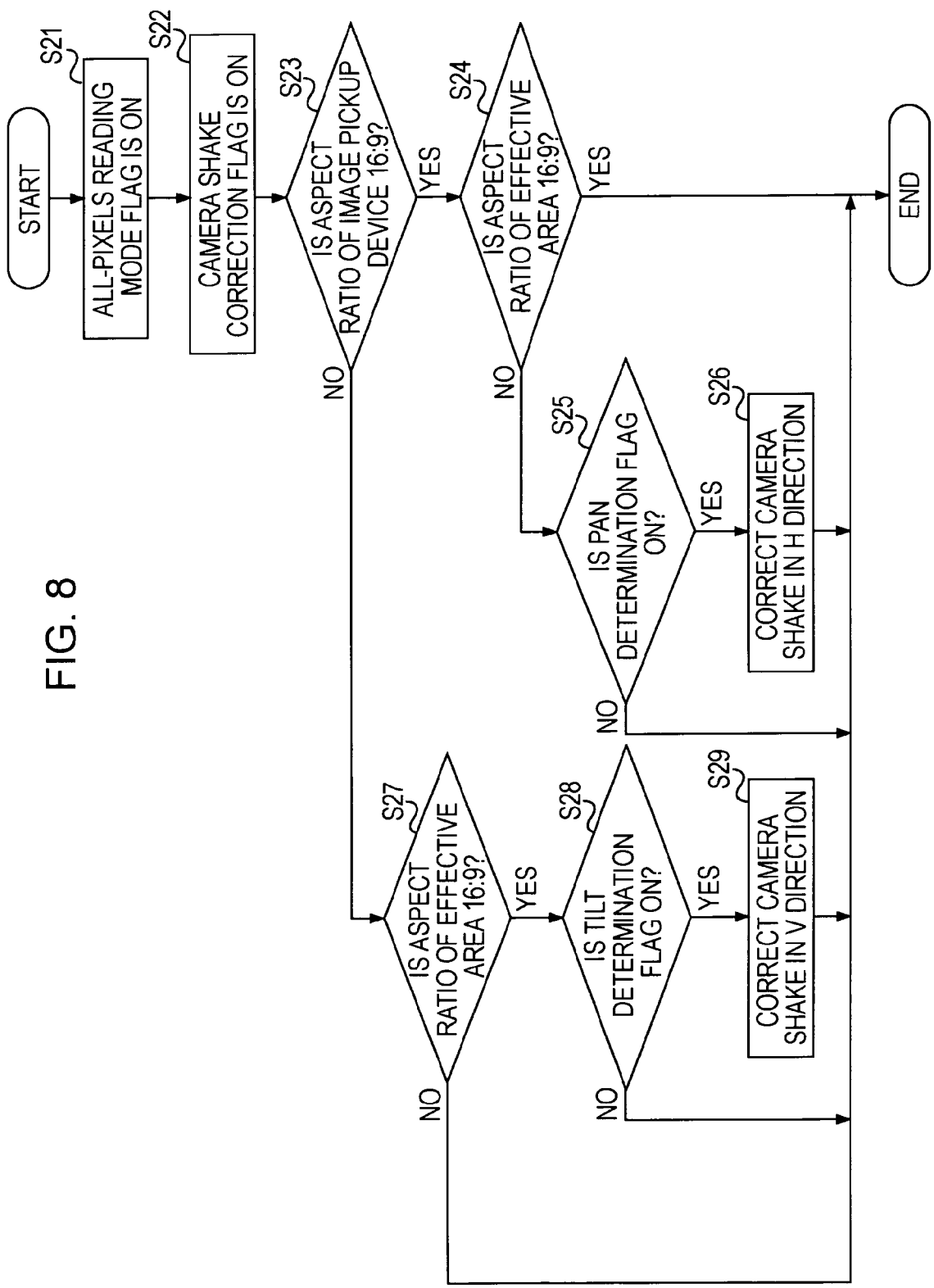
FIG. 8 is a flowchart of a camera shake correction determining process performed by the image pickup apparatus.

FIG. 8 is a flowchart showing a camera shake correction determining process performed by the image pickup apparatus. Hereinafter, the process shown in FIG. 8 is described with reference to the respective steps.

<Step S21>
The system controller 170 checks that the flag of the all-pixels reading mode is ON.

<Step S22>
The system controller 170 checks that the flag of the camera shake correcting function is ON.

<Step S23>
The system controller 170 determines whether the aspect ratio of the image pickup device 120 is 16:9. If the system controller 170 determines that the aspect ratio is 16:9, the process proceeds to step S24. If the system controller 170 determines that the aspect ratio is 4:3, the process proceeds to step S27.

<Step S24>
The system controller 170 determines whether the aspect ratio of the effective area is 16:9. If the system controller 170 determines that the aspect ratio is 16:9, the process ends. That is, when the aspect ratio of both the image pickup device 120 and the effective area is 16:9, the entire image 200 matches the effective area 211 as shown in FIG. 3B. In this case, all of the pixel signals that can be output from the image pickup device 120 can be used to generate an image. However, it may be impossible to perform electronic camera shake correction because there is no redundant pixel area. On the other hand, if the system controller 170 determines that the aspect ratio of the effective area is 4:3, the process proceeds to step S25.

<Step S25>
The system controller 170 determines whether a pan determination flag indicating panning is being done is ON. If the system controller 170 determines that the pan determination flag is ON, the process proceeds to step S26. If not, the process ends.

<Step S26>
The system controller 170 outputs a control signal to perform camera shake correction in the H direction to the memory controller 150. The aspect ratio of the image pickup device 120 is 16:9 and the aspect ratio of the effective area is 4:3, and thus the effective area 221 and the redundant pixel areas 202 are set on the entire image 200, as shown in FIG. 4B. If camera shake in the H direction occurs and if the redundant pixel areas 202 exist, the camera shake can be corrected by shifting the effective area 221 in the H direction by using the redundant pixel areas 202 in accordance with the camera shake. Therefore, when the aspect ratio of the image pickup device 120 is 16:9 and when the aspect ratio of the effective area is 4:3, the number of pixel signals can be increased by turning ON the all-pixels reading mode. Accordingly, resolution can be increased and camera shake in the H direction can be corrected.

<Step S27>
The system controller 170 determines whether the aspect ratio of the effective area is 16:9. If the system controller 170 determines that the aspect ratio is 16:9, the process proceeds to step S28. If the system controller 170 determines that the aspect ratio is 4:3, the process ends. That is, when the aspect ratio of both the image pickup device 120 and the effective area is 4:3, the entire image 230 matches the effective area 241 as shown in FIG. 5B. In this case, all of the pixel signals that can be output from the image pickup device 120 can be used to generate an image. However, it may be impossible to perform electronic camera shake correction because there is no redundant pixel area.

<Step S28>
The system controller 170 determines whether a tilt determination flag indicating tilt is being done is ON. If the system controller 170 determines that the tilt determination flag is ON, the process proceeds to step S29. If not, the process ends.

<Step S29>
The system controller 170 outputs a control signal to perform camera shake correction in the V direction to the memory controller 150. The aspect ratio of the image pickup device 120 is 4:3 and the aspect ratio of the effective area is 16:9, and thus the effective area 251 and the redundant pixel areas 232 are set on the entire image 230, as shown in FIG. 6B. If camera shake in the V direction occurs and if the redundant pixel areas 232 exist, the camera shake can be corrected by shifting the effective area 251 in the V direction by using the redundant pixel areas 232 in accordance with the camera shake. Therefore, when the aspect ratio of the image pickup device 120 is 4:3 and when the aspect ratio of the effective area is 16:9, the number of pixel signals can be increased by turning ON the all-pixels reading mode. Accordingly, resolution can be increased and camera shake in the V direction can be corrected.

According to the above-described process, if a redundant pixel area exists even though an effective area is set by using the entire image to a maximum extent while the aspect ratio of the effective area being maintained, an image can be generated by using more pixel signals compared to a case where an image is picked up by using a known camera shake correcting function. Furthermore, camera shake can be corrected by using the redundant pixel area. Accordingly, images of high resolution and high quality can be picked up. Also, images free from camera shake can be picked up by correcting camera shake.

For example, when the aspect ratio of the image pickup device 120 is 16:9, as shown in FIGS. 3A and 3B or 4A and 4B, when the all-pixels reading mode is ON, and when the aspect ratio of the effective area can be switched between 16:9 and 4:3, the quality of an image to be picked up can be enhanced in either aspect ratio of the effective area. When the aspect ratio of the effective area is switched from 16:9 to 4:3, the redundant pixel areas 202 that do not contribute to image generation are formed on the entire image 200, as shown in FIG. 4B. Accordingly, the quality of the image can be enhanced and camera shake can be corrected by using the redundant pixel areas 202, so that pixel signals can be effectively used.

Also, when the aspect ratio of the image pickup device 120 is 4:3, as shown in FIGS. 5A and 5B or 6A and 6B, when the all-pixels reading mode is ON, and when the aspect ratio of the effective area can be switched between 16:9 and 4:3, the quality of an image to be picked up can be enhanced in either aspect ratio of the effective area. Furthermore, camera shake can be corrected by using the redundant pixel areas 232, which are generated when the aspect ratio of the effective area is switched, so that pixel signals can be effectively used.

The above-described image pickup apparatus is especially useful in the case where camera shake in the same direction is likely to occur and where high-quality images are required. Also, by limiting a function to perform mechanical camera shake correction, other than optical camera shake correction or electronic camera shake correction such as sensor-shifting camera shake correction, to the direction vertical to the direction of the redundant pixel area if the redundant pixel area exists, the cost and size of the apparatus can be reduced compared to a case where a mechanical camera shake correcting function capable of correcting camera shake in any direction is provided. Furthermore, a high-quality image can be picked up by effectively using pixels of the image pickup device and camera shake in any direction can be corrected.

In the above-described embodiment, the memory controller 150 sets an effective area in response to the instructions from the system controller 170. Alternatively, the TG 121 may transmit a timing signal to the image pickup device 120 in response to the instructions from the system controller 170 and the timing signal may control pixel signals to be output to the analog signal processor 130 so as to set an effective area.

It should be understood by those skilled in the art that various modifications, combinations, sub-combinations and alterations may occur depending on design requirements and other factors insofar as they are within the scope of the appended claims or the equivalents thereof.

The invention claimed is:

1. An image pickup apparatus to pick up images by using a solid-state image pickup device, the image pickup apparatus comprising: image signal reading means for reading image signals of a rectangular effective area in an image picked up by the image pickup device, the image pickup device having an aspect ratio associated therewith;

effective area setting means for setting an aspect ratio of the effective area and for setting the effective area to the image signal reading means so that pixel signals of all pixels of the image pickup device in one of a vertical direction and a horizontal direction of the effective area are read;

camera shake detecting means for detecting camera shake in the image pickup apparatus;

camera shake correction means for performing camera shake correction with regard to the camera shake detected by the camera shake detecting means; control means for controlling operation of the image pickup apparatus;

means for causing an all pixel reading mode to be turned on in which the pixel signals of all the pixels of the image pickup device in one of the vertical direction and the horizontal direction are read, during the all pixel reading mode (i) the control means determines the aspect ratio of the effective area and the aspect ratio associated with the image pickup device such that when the aspect ratio of the effective area and the aspect ratio associated with the solid-state image pickup device are different a redundant pixel area is provided, (ii) the control means causes the camera shake correction means to perform camera shake correction only in either the vertical direction or the horizontal direction and never in both the vertical direction and the horizontal direction such that when the aspect ratio of the effective area and the aspect ratio associated with the image pickup device are different so that the redundant pixel area is provided in only the other one of the vertical direction and the horizontal direction and when the camera shake detecting means detects a camera shake in the other one of the vertical direction and the horizontal direction camera shake correction is performed in only the other one of the vertical direction and the horizontal direction by shifting the effective area set to the image signal reading means to the other one of the vertical direction and the horizontal direction, and (iii) when the aspect ratio of the effective area matches the aspect ratio associated with the image pickup device, the redundant pixel area is not provided and the camera shake correction means does not perform camera shake correction in either the vertical direction or the horizontal direction.

2. The image pickup apparatus according to claim 1, wherein the effective area setting means can selectively set a first effective area or a second effective area, the first effective area being set so that pixel signals of all pixels of the solid-state image pickup device in the one of vertical and horizontal directions are read and that the redundant pixel area is provided in the other direction, and the second effective area being set so that all pixels in both vertical and horizontal directions are read, and wherein the camera shake correction control means is effective only when the first effective area is set.

3. The image pickup apparatus according to claim 2, wherein, if an aspect ratio of the solid-state image pickup device is 16:9, the camera shake correction control means is effective only when the effective area setting means sets an effective area having an aspect ratio of 4:3 as the first effective area.

4. The image pickup apparatus according to claim 2, wherein, if an aspect ratio of the solid-state image pickup device is 4:3, the camera shake correction control means is effective only when the effective area setting means sets an effective area having an aspect ratio of 16:9 as the first effective area.

5. An image pickup apparatus to pick up images by using a solid-state image pickup device, the image pickup apparatus comprising: an image signal reading unit to read image signals of a rectangular effective area in an image picked up by the image pickup device, the image pickup device having an aspect ratio associated therewith;

an effective area setting unit to set an aspect ratio of the effective area and to set the effective area to the image Signal reading unit so that pixel signals of all pixels of the image pickup device in one of a vertical direction and a horizontal direction of the effective area are read;

a camera shake detecting unit to detect camera shake in the image pickup apparatus;

a camera shake correction unit to perform camera shake correction with regard to the camera shake detected by the camera shake detecting unit; and a control unit to control operation of the image pickup apparatus; and means for causing an all pixel reading mode to be turned on in which the pixel signals of all the pixels of the image pickup device in one of the vertical direction and the horizontal direction are read, during the all pixel reading mode (i) the control unit determines the aspect ratio of the effective area and the aspect ratio associated with the image pickup device such that when the aspect ratio of the effective area and the aspect ratio associated with the image pickup device are different a redundant pixel area is provided, (ii) the control unit causes the camera shake correction unit to perform camera shake correction only in either the vertical direction or the horizontal direction and never in both the vertical direction and the horizontal direction such that when the aspect ratio of the effective area and the aspect ratio associated with the image pickup device are different so that the redundant pixel area is provided in only the other one of the vertical direction and the horizontal direction and when the camera shake detecting unit detects a camera shake in the other one of the vertical direction and the horizontal direction camera shake correction is performed in only the other one of the vertical direction and the horizontal direction by shifting the effective area set to the image signal reading unit to the other one of the vertical direction and the horizontal direction, and (iii) when the aspect ratio of the effective area matches the aspect ratio associated with the image pickup device, the redundant pixel area is not provided and the camera shake correction unit does not perform camera shake correction in either the vertical direction or the horizontal direction.

6. An image pickup method to pick up images by using a solid-state image pickup device, the image pickup method comprising the steps of:

reading image signals of a rectangular effective area in an image picked up by the image pickup device, the image pickup device having an aspect ratio associated therewith;

setting an aspect ratio of the effective area and setting the effective area to the reading step so that pixel signals of all pixels of the image pickup device in one of vertical direction and a horizontal direction of the effective area are read;

detecting camera shake in the image pickup apparatus; and causing an all pixel reading mode to be turned on in which the pixel signals of all the pixels of the image pickup device in one of the vertical direction and the horizontal direction are read, during the all pixel reading mode, determining the aspect ratio of the effective area and the aspect ratio associated with the image pickup device such that when the aspect ratio of the effective area and the aspect ratio associated with the image pickup device are different a redundant pixel area is provided, and performing camera shake correction only in either the vertical direction or the horizontal direction and never in both the vertical direction and the horizontal direction such that when the aspect ratio of the effective area and the aspect ratio associated with the image pickup device are different so that the redundant pixel area is provided in only the other one of the vertical direction and the horizontal direction and when a camera shake is detected in the other one of the vertical direction and the horizontal direction camera shake correction is performed only in the other one of the vertical direction and the horizontal direction by shifting the effective area set to the reading step to the other one of the vertical direction and the horizontal direction, and when the aspect ratio of the effective area matches the aspect ratio associated with the image pickup device, the redundant pixel area is not provided and the camera shake correction is not performed in either the vertical direction or the horizontal direction.

* * * * *